Figure 1:
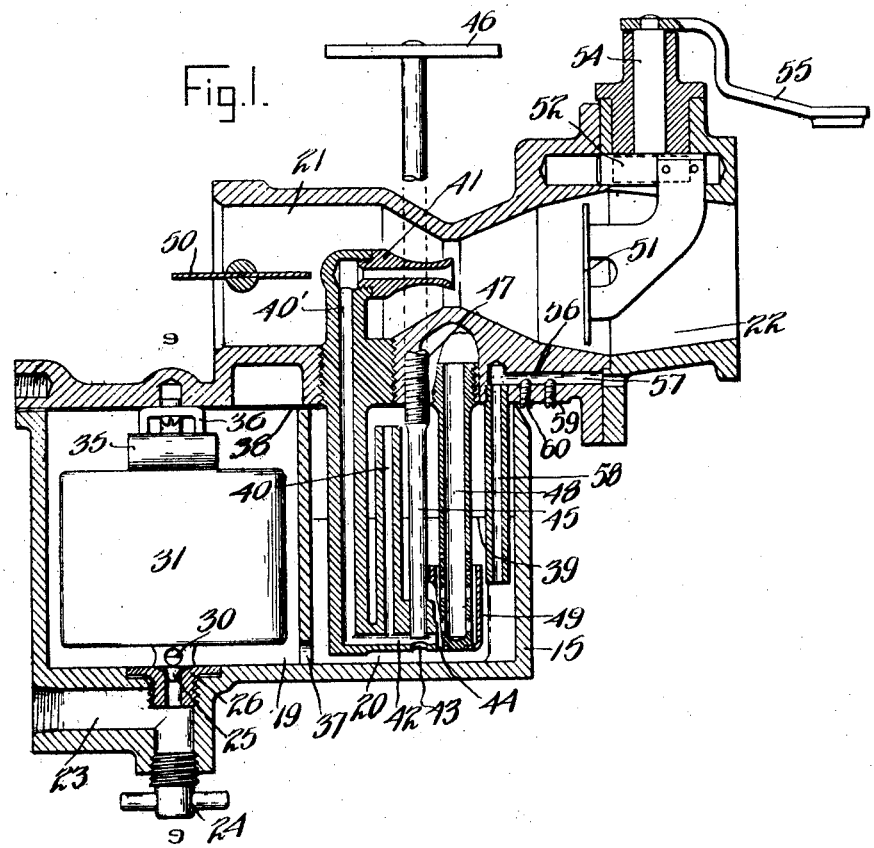

Jan. 17, 1928.

I. T. SWARTZ ET AL 1,656,342

CARBURETOR

Filed Nov. 25, 1924

3 Sheets-Sheet 1

Inventor
Ira T. Swartz
Arthur R. Baker

By

Attorney

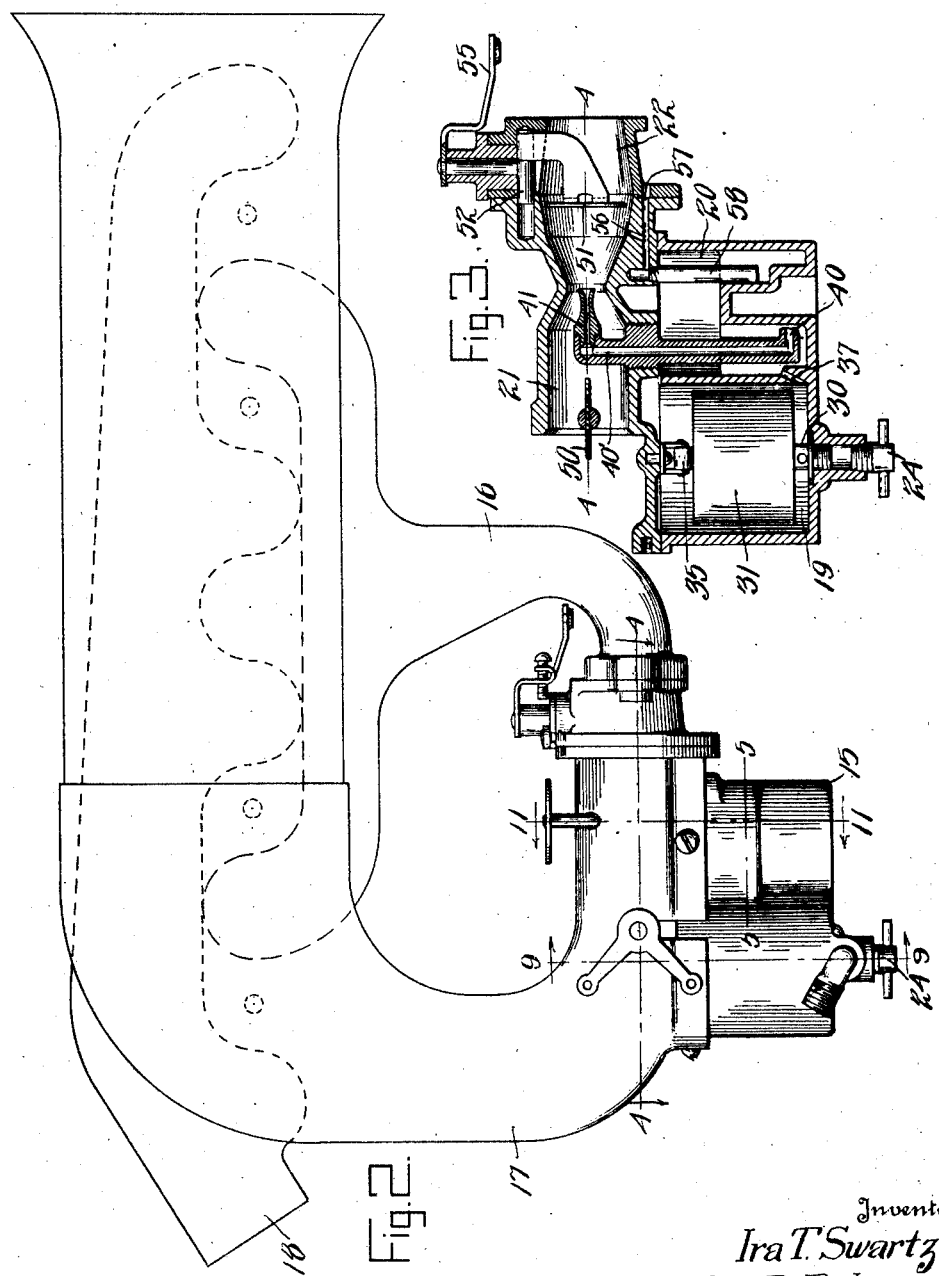

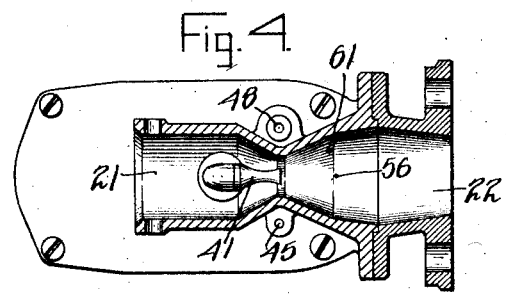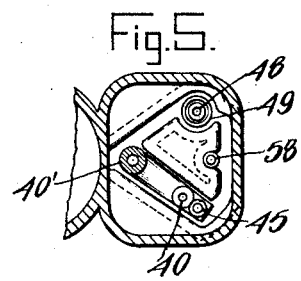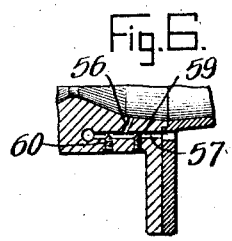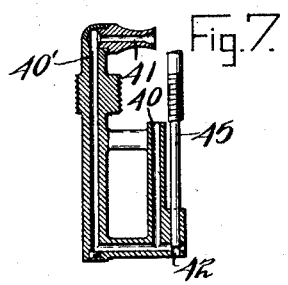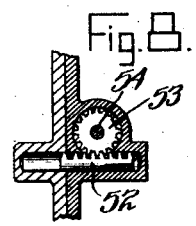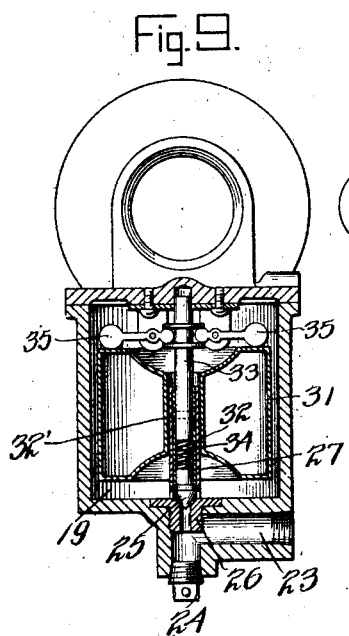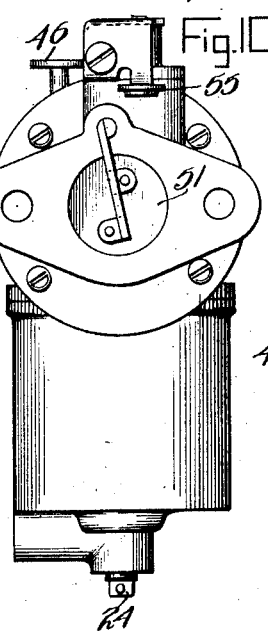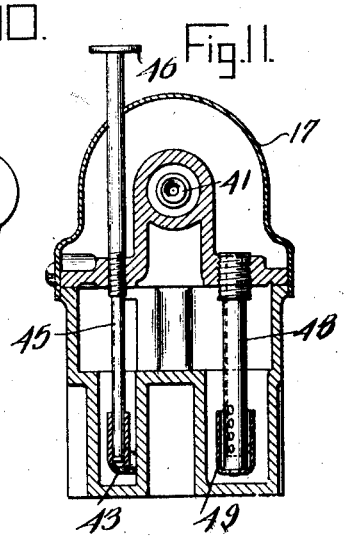

Patented Jan. 17, 1928.

1,656,342

UNITED STATES PATENT OFFICE.

IRA T. SWARTZ AND ARTHUR R. BAKER, OF INDIANAPOLIS, INDIANA; SAID BAKER ASSIGNOR TO SAID SWARTZ.

CARBURETOR.

Application filed November 25, 1924. Serial No. 752,253.

Our said invention relates to fuel feeding devices for internal combustion engines and it is an object of the same to provide a highly efficient means of this character in which the liquid fuel shall have drawn through it heated air partially carbureted instead of being mingled in a jet or otherwise with cold air as is commonly done in carburetors.

Another object of the invention is to control the consumption of gasoline by the velocity of the carbureted air which is automatically controlled by suction according to the speed of the engine instead of controlling the consumption of gasoline by the quantity of air commingled therewith to form a rich or lean mixture.

A further object of the invention is to introduce air into a passage-way completely filled with gasoline or other liquid fuel in a manner to cause the air to pass or bubble through the fuel so that the air may become saturated with the more volatile constituents of the fuel.

Referring to the accompanying drawings, which are made a part hereof and on which reference characters indicate similar parts, Figure 1 is a diagrammatic section of our device, Figure 2 a side elevation, Figure 3 a longitudinal central section, Figure 4 a horizontal section through the air and mixing chambers on line 4—4 of Figure 2.

Figure 5, a similar section through the fuel chamber on line 5—5 of Figure 2.

Figure 6, a detail of an air inlet shown in Figure 1,

Figure 7, a detail of a fuel passage in Figure 1,

Figure 8, a detail of adjusting means for the throttle of Figure 1,

Figure 9, a section through the float chamber on line 9—9 of Figure 2,

Figure 10, an elevation taken from the right side of Figure 1, and

Figure 11 a section on line 11—11 of Figure 2.

In the drawings reference character 15 indicates the outer casing of a carburetor communicating with an intake manifold 16 and a jacket 17 partially surrounding the outlet manifold 18. The carburetor is provided with a float chamber 19 from which the fuel passes to an agitating chamber 20. Above the agitating chamber is an air chamber 21 and this is connected to a mixing chamber 22 by a relatively narrow neck.

The fuel enters the float chamber through a passage 23 having a branch leading directly down from the center of the float chamber, said branch being closed by a plug 24. The main passage is closed by a valve 25 seated in a hollow plug 26.

A sleeve 27, (Fig. 9) rests at its lower end on the plug 26 or may be secured thereto and this sleeve has lateral passages at 30 forming branches of the passage 23. The sleeve 27 provides a guide for the float 31 which moves up and down thereon. Within the sleeve 27 is another sleeve 32 keyed at 32' to a valve stem 33 and forming a part of such stem, but relatively movable since the connection is a loose one by means of a pin on one part and a slot on the other longer than the diameter of the pin. The valve 25 is conical with a shoulder at the upper end and a short reduced extension above the shoulder which is fixed in any convenient manner to the sleeve 32. A spring is provided between the adjacent ends of the valve and the stem 33. A pair of collars at the upper end of the stem receive between them the rounded ends of a pair of levers 35 weighted at their outer ends where they bear on the upper end of the float 31 said levers being pivoted on brackets 36 secured to the roof of the float chamber. It will be seen that as the float moves up and down according to the amount of fuel in the chamber the valve stem will be moved in the opposite direction; i. e., when the chamber is full the valve stem will be moved down and will press with greater force on the spring 34 thereby forcing the valve against its seat in the plug 26, while decreasing depth of fuel permits the float to fall aided by the weights on levers 35 thereby lifting the valve stem and permitting additional fuel to enter through the valve.

A passage 37 leads from the float chamber to the agitating chamber for conducting fuel into the agitating chamber. At the upper end of the partition between the two chambers a narrow passage is left between the two at 38 for equalizing the pressure in the two chambers. The fuel should rise in the agitating chamber approximately to the level indicated at 39 to secure the best results.

The agitating chamber is provided with a passage 40 opening into the chamber above the gasoline level in a space which is filled with carbureted fuel produced by the agitation of said fuel as hereinafter described. The passage 40 leads down nearly to the bottom of the chamber then parallel to the bottom of the chamber for a distance, then upward at 40' and through a small Venturi tube 41 to the neck between the mixing and expansion chambers which in effect forms a larger Venturi tube. A passage 42 intersects the passage 40, the passage 42 having two ports at 43 and 44 communicating with the fuel in the agitating chamber. A valve 45 having a flat end intersects the passage 42, this valve extending up through the carburetor and having a button or hand wheel 46 at its upper end for manually adjusting the valve, the stem of the valve being provided with screw threads at 47 to hold it in adjusted position.

It may be noted that the passage 40 is of uniform bore throughout its entire length except at the ends of the small Venturi tube and that the valve 45 is flat at its end whereby the stream of fuel entering the passage 40 is flattened to cause a better mixture between the air and the liquid. This also avoids the necessity of providing a groove or seat as in the case of valves having a pointed end. The mixture of air and fuel entering the passage 40 under the suction of the engine will travel along said passage and discharge from the passage through the flared or bell-shaped Venturi tube.

In order that the upper part of the chamber shall not become empty of varopized fuel I have provided means for supplying additional increments thereof, this means involving the passage of air through the body of liquid fuel in the lower part of the chamber for the purpose of vaporizing the fuel both by direct action of the air in motion and by the heating effect of the air which is taken in greater or less part from a supply passing about the outlet manifold so as to be heated by the heat of the exhaust gases. Such heat will also accelerate the natural volatilization of the fuel or of the more volatile parts thereof. For this purpose I have provided a tube 48 see Fig. 11 extending from within the chamber formed by the casing 17 which extends around the intake and exhaust manifolds and has communication with the atmosphere at such point down into the agitating chamber, such tube having lateral openings at its lower end below the fuel level and being surrounded by a cup 49 extending up far enough to include all or nearly all of the lateral openings. The cup has a port adjacent the port 44 through which gasoline may enter and pass between the cup and the tube 48 or as here shown the wall of the cup may be broken away to a considerable extent for the same purpose. It will be understood that air (preferably heated) passes down through the tube and out through the lateral passages after which it bubbles up through the fuel to the upper end of the chamber. The cup which closely surrounds the tube flattens out the bubbles coming through the lateral passages and insures a more intimate mixture of the air and the fuel.

The air chamber is provided with a choke butterfly valve 50 for regulating the supply of air passing around the Venturi tube. A throttle valve 51 in the mixing chamber cooperates with a conical part of the chamber to vary the amount of fuel passing to the intake manifold. The throttle valve is mounted on a slidable rod or bar 52 provided with rack teeth engaged by a pinion 53 on a shaft 54. A rockarm 55 at the upper end of the shaft is connected in any convenient manner to manually operate the mechanism by varying the position of the throttle. As the throttle moves to the left it will cause a gradual and uniform decrease in the size of the annular space between the rim of the throttle and the inner wall of the mixing chamber. The mixture is attenuated to a thin cylindrical veil in its passage about the throttle thus causing a very thorough mixing to take place. At the innermost idling position of the throttle valve such space will be entirely or almost entirely closed, thereby causing danger of choking the engine. To avoid such a contingency I have provided a by pass passage 56 communicating by a passage 57 with the outer air and by a passage 58 with the fuel in the expansion chamber, the latter passage being formed in a tube extending below the level of the fuel. A pair of screws 59 and 60 in the respective passages provide means for adjusting the relative amounts of air and fuel. The suction of the engine at idling speed is relatively great and will draw through the small passage 56 sufficient fuel for idle running even if no fuel is supplied by way of the passage 40.

A vent passage 61 is provided between the agitating chamber 20 and the mixing chamber 22 (Fig. 4), the purpose of this passage being to equalize pressure in the agitating chamber and the mixing chamber and permit fuel to be drawn through the passages. When fuel is admitted to the agitating chamber there is no way for the air entrapped by inrushing air to escape except gradually by way of passage 40 and by way of the tube 48. The openings in the lower end of tube 48 are considerably below the normal fuel level so that they do not have any effect on the escape of the air after the fuel passes a certain level, hence the need for the equalizing passage 61.

It will be obvious to those skilled in the art that various modifications may be made in our device without departing from the spirit of the invention and therefore we do not limit ourselves to what is shown in the drawings and described in the specification, but only as indicated in the appended claims.

Having thus fully described our said invention, what we claim as new and desire to secure by Letters Patent, is:

1. In a carburetor, adapted to maintain a normal fuel level, a tube in communication with the atmosphere leading into the chamber to a point below the normal level of the fuel, a plurality of relatively small ports in said tube below the normal fuel level, and a cup surrounding the lower end of the tube having its sides slightly spaced from the tube substantially as set forth.

2. In a carburetor, adapted to maintain a normal fuel level, a tube in communication with the atmosphere leading into the chamber to a point below the normal level of the fuel, a plurality of relatively small ports in said tube below the normal fuel level, a cup surrounding the lower end of the tube having its sides slightly spaced from the tube, and a passage leading into the cup at the lower end thereof for admission of the liquid fuel, substantially as set forth.

3. In a carburetor, an air chamber, a mixing chamber connecting the intake manifold and the mixing chamber, a Venturi formed by said chambers, a small Venturi located concentrically with said first mentioned Venturi, a liquid fuel agitating chamber, means for feeding air to said chamber below the level of fuel therein, a mixture passage leading from the upper part of said agitating chamber through the fuel therein to the small venturi, and means for supplying liquid fuel to said passage, substantially as set forth.

4. In a carburetor the combination of an air chamber, a mixing chamber having a tapered wall, an agitating chamber, a tube having communication with the agitating chamber, said tube extending axially of the air chamber and terminating at the entrance to the mixing chamber for discharging fuel axially into the same, a valve disposed in said mixing chamber and movable longitudinally of the same for controlling the supply of mixture passing therethrough, said valve forming a baffle against which the mixture from said tube is discharged, means for feeding air to the liquid fuel chamber below the level of the fuel therein and a passage having communication with the upper portion of the liquid fuel chamber and having connection below the fuel level with the tube leading to the mixing chamber, substantially as set forth.

5. A carburetor comprising a cylindrical mixing chamber tapered at one end, a fuel nozzle disposed axially of said mixing chamber in a manner to discharge fuel axially into the small end of the same, a disk movable axially of the chamber toward and from said fuel nozzle for controlling the supply of mixture to the engine, said disk forming a baffle for breaking up the fuel discharged from said nozzle, and a passage leading through the tapered wall of the mixing chamber at the engine side of the extreme closed position of the disk and having communication with a supply of liquid fuel, substantially as set forth.

6. A carburetor comprising a cylindrical mixing chamber tapered at one end, a fuel nozzle disposed axially of said mixing chamber in a manner to discharge fuel axially into the small end of the same, a disk movable axially of the chamber toward and from said fuel nozzle for controlling the supply of mixture to the engine, said disk forming a baffle for breaking up the mixture discharged from said nozzle, a passage leading through the tapered wall of the mixing chamber at the engine side of the extreme closed position of the disk and having communication with a supply of liquid fuel, and means for controlling the supply of fuel through said passage, substantially as set forth.

7. A carburetor comprising a cylindrical mixing chamber tapered at one end, a fuel nozzle disposed axially of said mixing chamber in a manner to discharge fuel axially into the small end of the same, a disk movable axially of the chamber toward and from said fuel nozzle for controlling the supply of mixture to the engine, said disk forming a baffle for breaking up the mixture discharged from said nozzle, a passage leading through the tapered wall of the mixing chamber at the engine side of the extreme closed position of the disk and having communication with a supply of liquid fuel, means for controlling the supply of fuel through said passage, means for admitting air into said passage for combining with fuel passing therethrough and means for varying the amount of air admitted, substantially as set forth.

In witness whereof, we have hereunto set our hands at Indianapolis, Indiana, this 21st day of November, A. D. nineteen hundred and twenty-four.

IRA T. SWARTZ.
ARTHUR R. BAKER.